(12) United States Patent
Andersen

(10) Patent No.: US 6,851,717 B1
(45) Date of Patent: Feb. 8, 2005

(54) MUD FLAP

(76) Inventor: Barry Andersen, 420 S. Lovell Ave., East Ridge, TN (US) 37412

(*) Notice: Subject to any disclaimer, the term of this patent is extended or adjusted under 35 U.S.C. 154(b) by 0 days.

(21) Appl. No.: 10/618,009

(22) Filed: Jul. 11, 2003

Related U.S. Application Data (63) Continuation-in-part of application No. 09/905,819, filed on Jul. 16, 2001, now abandoned.

(51) Int. Cl.$^7$ .............................................. B62D 25/18
(52) U.S. Cl. ......................... 280/847; 280/851; 280/848
(58) Field of Search ................................ 280/847, 853, 280/152.3, 848, 849, 851

(56) References Cited

U.S. PATENT DOCUMENTS

| | | | |
|---|---|---|---|
| 2,782,053 A | | 2/1957 | Long |
| 3,088,751 A | | 5/1963 | Barry et al. |
| 3,350,114 A | | 10/1967 | Salisbury |
| 3,497,238 A | * | 2/1970 | Ewell .......................... 280/851 |
| 3,582,108 A | * | 6/1971 | Carlton ........................ 280/851 |
| 4,487,422 A | * | 12/1984 | Turunen ..................... 280/851 |
| D279,560 S | | 7/1985 | Jensen |
| 4,660,846 A | | 4/1987 | Morin |
| 4,921,276 A | | 5/1990 | Morin |
| 4,964,655 A | | 10/1990 | Tucker |
| 5,145,617 A | * | 9/1992 | Hermanson et al. ......... 264/143 |
| 5,273,318 A | * | 12/1993 | Nakayama et al. ......... 280/851 |
| 5,366,247 A | * | 11/1994 | Fischer ....................... 280/851 |
| 5,564,750 A | * | 10/1996 | Bajorek et al. ............. 280/851 |
| 5,582,430 A | | 12/1996 | Bauer et al. |
| 2003/0141713 A1 | * | 7/2003 | Morin et al. ................ 280/847 |
| 2004/0080185 A1 | * | 4/2004 | Loddo ........................ 296/198 |

FOREIGN PATENT DOCUMENTS

| | | | | |
|---|---|---|---|---|
| GB | 2144690 A | * | 3/1985 | ........... B62D/25/18 |
| JP | 6-72356 | * | 6/1994 | ........... B62D/25/18 |

* cited by examiner

Primary Examiner—Christopher P. Ellis
Assistant Examiner—J. Allen Shriver
(74) Attorney, Agent, or Firm—Chambliss, Bahner & Stophel, P.C.

(57) ABSTRACT

A mud flap adapted to be attached behind or outside a wheel of a vehicle. The mud flap includes an integrally-formed, mesh panel. The integrally-formed, mesh panel has a front face, a top edge and a plurality of strands. The plurality of strands define a plurality of openings adapted to permit air to flow therethrough. The sum of the areas of the plurality of openings represents at least 75% of the surface area of the front face of the panel. Each individual opening in the integrally-formed, mesh panel is sized such that it deflects substantially all water and roadway debris it encounters. The mud flap also includes a means for attaching the panel to a vehicle.

19 Claims, 11 Drawing Sheets

MUD FLAP

CROSS-REFERENCE TO RELATED APPLICATIONS

This application is a continuation-in-part of the application entitled Mud Flap which was filed on Jul. 16, 2001 now abanonded and assigned Ser. No. 09/905,819, the disclosure of which is fully incorporated herein by reference.

FIELD OF THE INVENTION

This invention relates generally to mud flaps adapted for use on wheeled vehicles. More particularly, the invention relates to an integrally-formed, mesh mud flap that is thin, lightweight and adapted to allow air to pass therethrough while deflecting substantially all of the water and roadway debris it encounters.

BACKGROUND AND DESCRIPTION OF THE PRIOR ART

Many types of mud flaps have been used for preventing water, mud, rocks and other roadway debris from being directed rearwardly and sidewardly from a moving wheeled vehicle into the path of following traffic. Typically, mud flaps are substantially rectangular in shape and have a solid deflecting panel. The top edge of a typical mud flap is mounted behind a wheel of a vehicle such that the bottom of the mud flap hangs freely near the roadway surface.

While conventional solid mud flaps are effective in deflecting water and roadway debris, they suffer from several disadvantages. First, the solid design of the conventional mud flap prevents air from passing through it, thereby increasing the drag created by the mud flap and decreasing fuel economy. Also, the bottom of a solid mud flap may be displaced rearwardly at high rates of speed, thereby reducing the amount of water and debris the mud flap deflects. Further, the conventional solid mud flap increases the temperature in the area of the tire of the vehicle because air is not permitted to flow through the mud flap. Increased temperature in the area of the tire increases the risk of tire failure. In addition, the sold design of the typical mud flap prevents any water or other roadway debris encountered by the mud flap from passing through the mud flap. As a result, a large proportion of the water and other roadway debris encountered by a conventional solid mud flap is projected off the sides of the mud flap and into the path of other vehicles. The conventional mud flap is also heavy and, therefore, decreases fuel economy and payload capacity.

Several modifications have been made to the conventional solid mud flap to address the disadvantages identified above. For example, mud flaps have been provided with openings to permit some air, water and other debris to pass through the mud flap. Typically, the openings are defined, at least in part, by rearwardly and downwardly extending louvers or flaps. For example, U.S. Pat. No. 3,350,114 of Salisbury describes a mud flap having a plurality of flexible flaps adapted to be opened by a stream of water and capable of deflecting said stream downwardly. Absent a stream of water, however, the flexible hinged flaps remain substantially closed over the aperture with which each is associated. As a result, the flexible flaps do little to reduce the drag created by the mud flap, the weight of the mud flap, the rearward displacement of the bottom of the mud flap at high speeds, or the increased temperature in the area of the tire. Further, when the flexible flaps are opened by a stream of water, substantial quantities of water may pass through the mud flap without deflection.

Several patents describe mud flaps having openings defined by louvers. See, e.g. U.S. Pat. Nos. 3,088,751; 4,660,846; and 4,921,276. U.S. Pat. No. 5,366,247 of Fischer describes a vehicle splashguard having louvers adapted to deflect water and other debris downwardly rather than sidewardly or rearwardly into the path of following traffic. The louvers extend generally horizontally across substantially the entire width of the splashguard. Similarly, U.S. Pat. No. 5,564,750 of Bajorek et al. describes a mud flap having louvers that extend horizontally across substantially the entire width of the mud flap. In addition, the mud flap of Bajorek includes a vertical rib member midway between the ends of each louver to provide vertical support to the louvers. The louvers of these mud flaps, however, do little to reduce the drag forces created by air resistance because the sum of the areas of the openings is small relative to the surface area of the mud flap panel, and the louvers are angled only slightly from the vertical axis. The louvers of these mud flaps are also likely to break or crack with extended use. In addition, the louvers of these mud flaps increase the depth or thickness of the mud flaps, which may not be desirable on certain types of vehicles. Further, the design of these mud flaps is complicated, and the cost of manufacture, maintenance and repair is high.

Other attempts to overcome the disadvantages of the conventional solid mud flap have been made. U.S. Pat. No. 5,273,318 of Nakayama describes a vehicle mudguard having multiple screens and draining ribs. The mud flap described in Nakayama, however, does not permit any air to flow through it. U.S. Pat. No. 5,582,430 of Baucr et al. describes a spray protection device having an inlet layer and a spacer layer which creates a void therebetween. Such screens and layers, however, are typically made from metal which tends to rust with use and increases the weight of the mud flap. In addition, the complex air flow design of the screens and layers tends to become clogged with use. Like the mud flap of Nakayama, the mud flap of Bauer does not permit air to flow entirely through it. U.S. Pat. No. 4,964,655 of Tucker describes a heavy duty mud flap made from metal segments connected by rods which contain a plurality of alternating rubber discs and spacers. This mud flap is also heavy and complex, thereby increasing fuel consumption and manufacturing, maintenance and repair costs.

It would be desirable, therefore, if a mud flap could be provided which reduces the amount of water and other road debris that is projected off the sides of the mud flap. It would also be desirable if a mud flap could be provided which allows air to pass through its opening. It would also be desirable if a mud flap could be provided which allows some water and other road debris to pass through its openings. It would be further desirable if a mud flap could be provided that is lightweight and resistant to rust and corrosion. It would be still further desirable if a mud flap could be provided that has a single, integrally-formed, mesh panel adapted to allow air to pass through it while deflecting substantially all of the water and roadway debris it encounters. It would also be desirable if a mud flap could be provided which reduces the weight and drag created by the mud flap, thereby increasing fuel economy, payload capacity, and the amount of water and roadway debris the mud flap deflects. It would also be desirable if a mud flap could be provided which does not contribute to increasing the temperature in the area of the tire of a vehicle. It would also be desirable if a mud flap could be provided which is less complicated and costly to manufacture, maintain and repair. It would also be desirable if a mud flap could be provided which is not likely to become clogged with use and is easily unclogged and cleaned. It would also be desirable if a mud flap could be provided that is relatively thin and therefore suitable for use on substantially all types of vehicles. It would be further desirable if a mud flap could be provided which is lightweight and resistant to rust and corrosion.

ADVANTAGES OF THE INVENTION

Accordingly, it is an advantage of the invention claimed herein to provide a mud flap which reduces the amount of water and other roadway debris that is projected off the sides of the mud flap. It is also an advantage of the invention to provide a mud flap that permits air to flow through its openings. It is also an advantage of the invention to provide a mud flap which permits some water and other roadway debris to pass through its openings. It is another advantage of the invention to provide a mud flap that has a single, integrally-formed, mesh panel adapted to allow air to pass through it while deflecting substantially all of the water and roadway debris it encounters. It is another advantage of the invention to provide a mud flap which reduces the weight and drag created by the mud flap, thereby increasing fuel economy, payload capacity, and the amount of water and roadway debris the mud flap deflects. It is still another advantage of the invention to provide a mud flap which does not contribute to increasing the temperature in the area of the tire of a vehicle. It is another advantage of the invention to provide a mud flap which is less complicated and costly to manufacture, repair and maintain. It is yet another advantage of the invention to provide a mud flap which is not likely to become clogged with use and is easily unclogged and cleaned. It is also an advantage of the invention to provide a relatively thin mud flap that is suitable for use on substantially all types of vehicles. It is another advantage of the invention to provide a lightweight mud flap which is resistant to rust and corrosion.

Additional advantages of this invention will become apparent from an examination of the drawings and the ensuing description.

Explanation of Technical Terms

As used herein, the term "integrally-formed, mesh panel" refers to any relatively lightweight and thin mesh, grid, netting or screen having a plurality strands that define a plurality of openings or interstices between the strands of the panel. The strands of the "integrally-formed, mesh panel" are not separate components merely attached or connected to each other to form the panel, but instead are interwoven or integrally-formed as by a press mold or the like. The strands of the "integrally-formed, mesh panel" may be arranged in a substantially orthogonal grid pattern such that there are a plurality of substantially parallel, horizontally-disposed strands and a plurality of substantially parallel, vertically-disposed strands. It is also contemplated that the strands of the "integrally-formed, mesh panel" may be arranged such that they are all substantially parallel to each other, in either a substantially horizontal or a substantially vertical arrangement. It is further contemplated that the strands of the "integrally-formed, mesh panel" may be arranged in a diagonal, angled, or arcuate disposition relative to the roadway surface. Further, the openings or interstices defined by the strands of the "integrally-formed, mesh panel" may be circular, ovate, square, rectangular, or any other suitable polygonal shape. The openings or interstices of the "integrally-formed, mesh panel" are relatively small, preferably on the order of 8–16 openings per linear inch for square openings or 12–164 openings per square inch for non-square openings. The openings or interstices of the "integrally-formed, mesh panel" preferably include a minimum dimension, whether it be the diameter for a circular opening, the minor axis for an ovate opening, the short side for a rectangular opening or the shortest side of a polygon for other polygonal openings, of no more than about ⅛ (0.125) inch.

SUMMARY OF THE INVENTION

The invention claimed herein comprises a mud flap adapted to be attached behind a wheel or outside a wheel of a vehicle. The mud flap includes an integrally-formed, mesh panel. The integrally-formed, mesh panel has a front face, a top edge, and a plurality of strands. The plurality of strands define a plurality of openings adapted to permit air to flow therethrough. The sum of the areas of the plurality of openings represents at least 75% of the surface area of the front face of the panel. Each individual opening in the integrally-formed, mesh panel is sized such that it deflects substantially all water and substantially all roadway debris it encounters. The mud flap also includes a means for attaching the panel to a vehicle.

In a preferred embodiment of the mud flap of the invention claimed herein, the integrally-formed, mesh panel has a thickness of no more than ⅛ (0.125) inch, and each opening in the panel has a minimum dimension of no more than ⅛ (0.125) inch. In another preferred embodiment, the mud flap includes a plurality of vertical and horizontal members adapted to provide structural support to the integrally-formed, mesh panel.

According to the method of the invention claimed herein, a mud flap is provided. The mud flap comprises an integrally-formed, mesh panel. The integrally-formed, mesh panel comprises a front face, a top edge, and a plurality of strands. The plurality of strands define a plurality of openings adapted to permit air to flow therethrough. The sum of the areas of the plurality of openings represents at least 75% of the total surface area of the front face of the panel. Each individual opening in the integrally-formed, mesh panel is sized such that it deflects substantially all water sprayed from a rotating wheel of a vehicle and substantially all roadway debris it encounters. The mud flap also includes a means for attaching the panel to a vehicle. The mud flap is attached to a vehicle behind or outside a wheel of the vehicle.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which like reference numerals represent like parts throughout, and in which:

FIG. 2 is an enlarged cross-sectional side view of a portion of the preferred embodiment of the invention taken along line 2—2 of FIG. 1a.

DESCRIPTION OF THE PREFERRED EMBODIMENTS OF THE INVENTION

Figure 1:
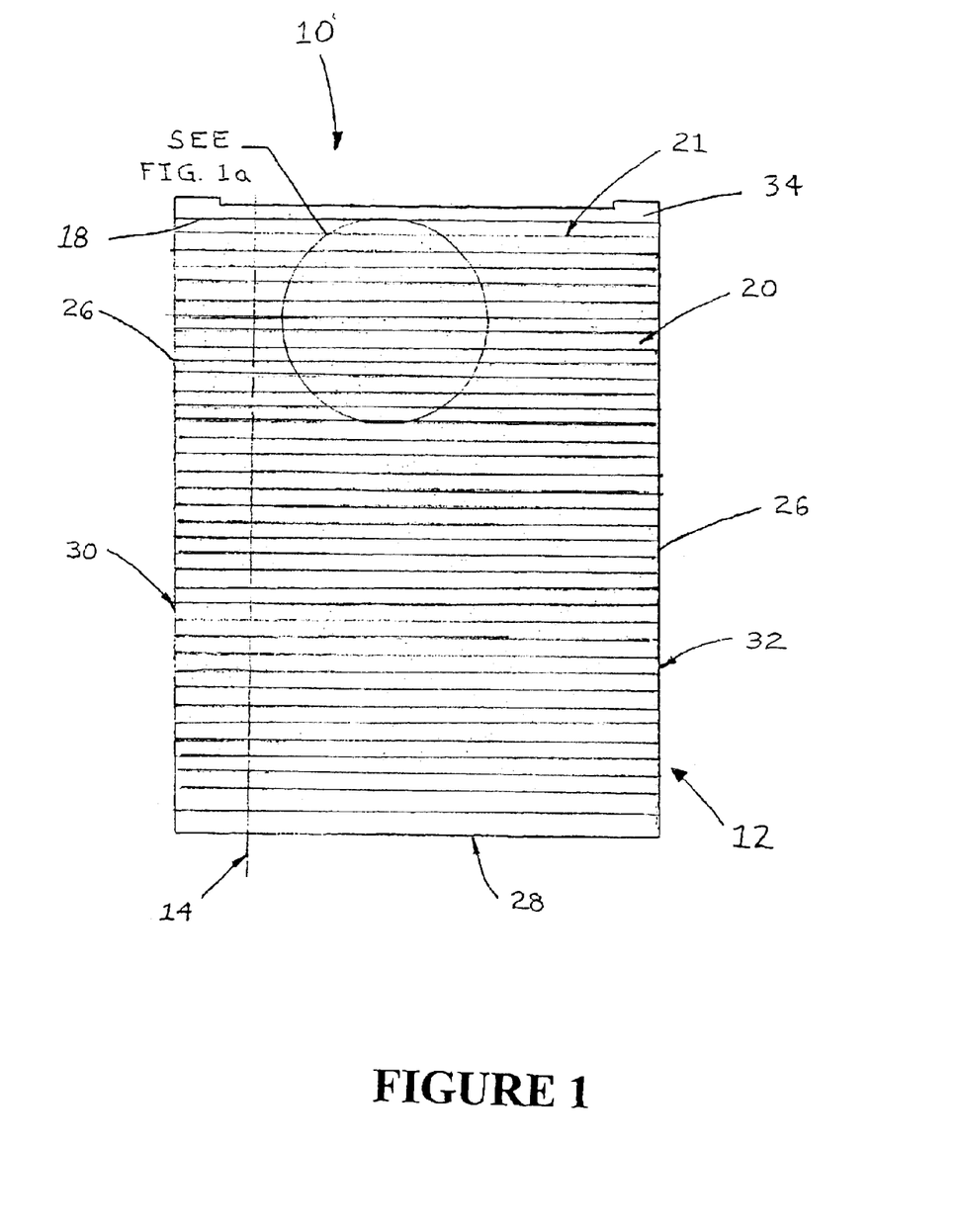
FIG. 1 is a front view of a preferred embodiment of the invention.

Referring now to the drawings, the apparatus of the invention is illustrated by FIGS. 1 through 8. As shown in FIG. 1, a preferred embodiment of the mud flap of the invention is designated generally by reference numeral 10. The mud flap of the invention is adapted to be attached behind or outside a wheel of a vehicle. Moreover, the mud flap is adapted to permit air to flow through it while substantially all water and roadway debris it encounters is deflected by it.

As shown in FIG. 1, the preferred mud flap 10 comprises integrally-formed, mesh panel 12 which comprises a plurality of substantially parallel, horizontally-disposed strands 21 and a pair of substantially parallel, vertically-disposed strands 26. Panel 12 may be manufactured using any suitable material conventionally used to make mud flaps such as polypropylene or some other elastomeric or polymeric material. It is also contemplated within the scope of the invention that integrally-formed, mesh panel 12 may be made from metal or a combination of a metallic material and an elastomeric or polymeric material. The preferred integrally-formed, mesh panel is manufactured using current plastic molding technology. In the preferred embodiment of the invention, the plastomeric material used to make panel 12 is heated until it becomes a liquid.

The liquid may then be introduced into a mold where it is allowed to cool and solidify into an integrally-formed construction.

As illustrated in FIG. 1, preferred panel 12 is generally rectangular in shape, but it is also contemplated within the scope of the invention that the panel may be any suitable shape for deflecting water and roadway debris propelled by the tires of a motor vehicle. Further, FIG. 1 illustrates a plurality of substantially parallel, horizontally-disposed strands 21 and a pair of substantially parallel, vertically-disposed strands 26. It is contemplated within the scope of the invention, however, that the panel may comprise a pair of horizontally-disposed strands and more than a pair of vertical strands. It is also contemplated that the panel may comprise only a plurality of horizontal strands or only a plurality of vertical strands. It is further contemplated within the scope of the invention that the strands of the panel may be diagonally- or angularly-disposed relative to the roadway surface. It is still further contemplated that the strands may be arcuate or some other suitable configuration that defines openings adapted to permit air to flow through the panel while the panel deflects substantially all of the water and roadway debris it encounters.

As illustrated in FIG. 1, the plurality of strands 21 and 26 of integrally-formed, mesh panel 12 define a plurality of openings 20. More particularly, each opening 20 is defined by a pair of horizontal strands 21 and a pair of vertical strands 26. In the preferred embodiment, each horizontal strand 21 is substantially parallel to top edge 18, and each vertical strand 26 is substantially perpendicular to top edge 18. Openings 20 are, therefore, substantially rectangular in shape. The surface area of front face 16 (See FIG. 2) of integrally-formed, mesh panel 12 is the area defined by top edge 18, lower edge 28, left side 30 and right side 32. The sum of the areas of openings 20 represents at least 75% of the surface area of front face 16 of integrally-formed, mesh panel 12. In a preferred embodiment of the invention, the sum of the areas of openings 20 represents at least 85% of the surface area of the front face of the integrally-formed, mesh panel.

In another preferred embodiment, openings 20 have a minimum dimension of no more than ⅛ (0.125) inch. More particularly, in this preferred embodiment, the diameter of a circular opening is no more than ⅛ (0.125) inch; the minor axis of an ovate opening is no more than ⅛ (0.125) inch; the side of a square opening is no more than ⅛ (0.125) inch; the short side of a rectangular opening is no more than ⅛ (0.125) inch; and the shortest side of a polygonal opening is no more than ⅛ (0.125) inch. Openings having these dimension limitations have been found to permit air to flow therethrough while substantially all water sprayed by the wheel of a vehicle and substantially all roadway debris encountered by the mud flap is deflected. In other words, openings having this dimensional limitation are large enough to permit air to flow through the panel without any significant rearward displacement of the panel when it is attached to a vehicle traveling at high speeds. By contrast, openings having this dimensional limitation are small enough to deflect substantially all of the water and other roadway debris the panel encounters. Openings having this dimensional limitation allow some water and roadway debris to move from the front face of the panel to the opposite side of the panel, but substantially all of the water and other roadway debris makes contact with the strands of the panel, and therefore, does not pass through the openings without being impeded, obstructed or impaired by the strands of the panel. Thus, openings having this dimensional limitation impede, obstruct or impair the path of travel of substantially all of the water and other roadway debris encountered by the panel because the strands of the panel are close enough to each other to "catch," "knock down" or deflect the water and other roadway debris. At the same time, however, the openings having this dimensional limitation are large enough to permit air to easily flow through the panel and large enough to permit some water and roadway debris to move from the front of the panel to the opposite side.

In a preferred embodiment, openings 20 are sized in accordance to limitations based upon the number of openings per linear inch or per square inch. For square openings, the preferred openings are sized such that there are between 8 and 16 openings per linear inch or between 64 and 256 openings per square inch. For rectangular openings, the openings are sized such that there are between 8 and 240 openings per square inch. For circular openings, the openings are sized such that there are between 8 and 16 per linear inch and between 64 and 256 openings per square inch.

While preferred openings 20 are formed by a mold that is used to define the shape of panel 12, the openings may also be made using any suitable conventional means for making openings such as a punch press or the like. It is still further contemplated that the horizontal strands and the vertical strands may be interwoven as shown in FIG. 3b and discussed in more detail below.

Still referring to FIG. 1, the preferred mud flap 10 also includes a means for attaching the panel to a vehicle such as connecting strip 34. Connecting strip 34 may be attached to the mesh panel near top edge 18 using any suitable means such as threaded fasteners, rivets, adhesives and the like. In addition, connecting strip 34 may be attached to a vehicle using any suitable means for attaching the mud flap behind or outside a wheel of a vehicle such as threaded fasteners, rivets, adhesives and the like. While FIG. 1 illustrates connecting strip 34 as the means for attaching the mud flap to a vehicle, it is contemplated that any suitable means for attaching a mud flap to a vehicle such as threaded fasteners, rivets, adhesives and the like may be used.

Figure 1A:
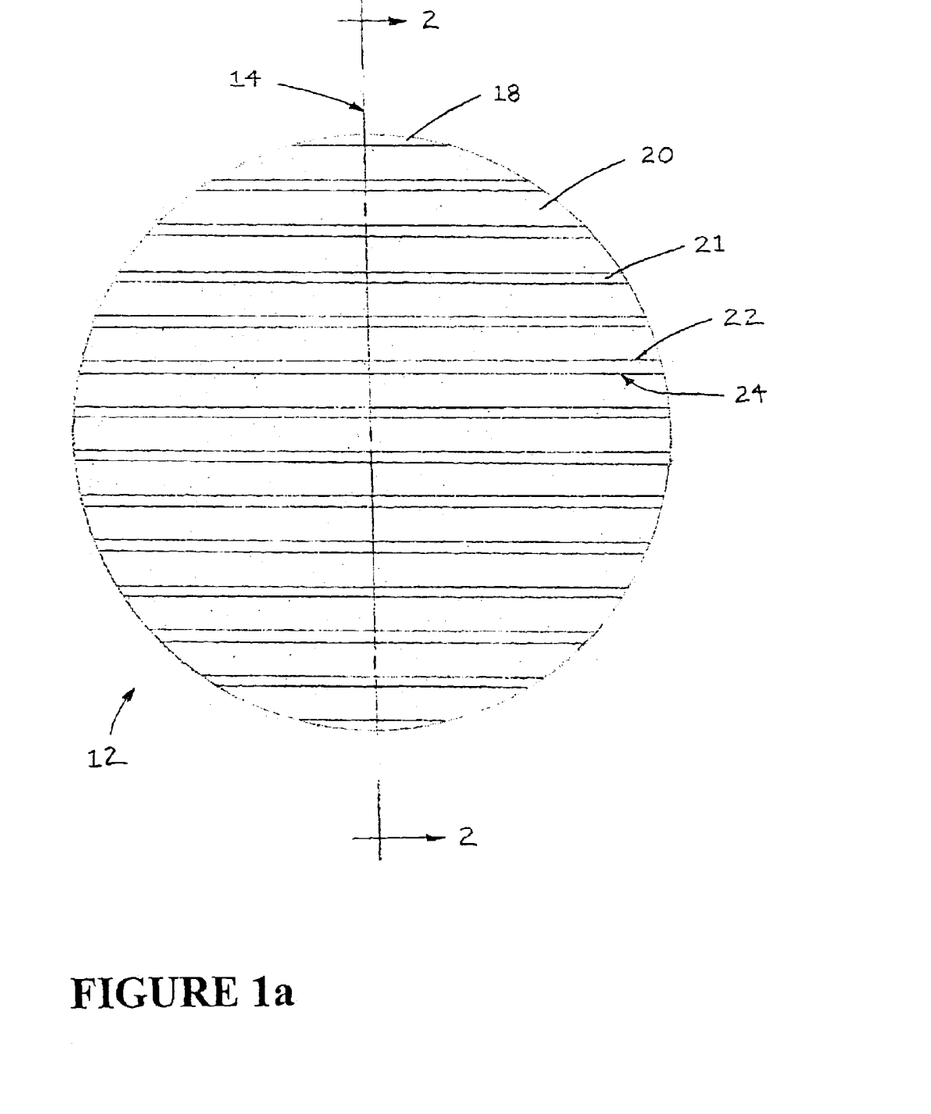
FIG. 1a is an enlarged front view of a portion of the preferred embodiment of the invention illustrated in FIG. 1.

FIG. 1a illustrates an enlarged front view of a portion of the embodiment of the invention illustrated in FIG. 1. As shown in FIG. 1a, each horizontal strand 21 has upper side 22 and lower side 24. Upper side 22 and lower side 24 are substantially perpendicular to vertical axis 14, substantially parallel to top edge 18, and preferably substantially planar. Openings 20 are defined, in part, by upper side 22 and lower side 24. Openings 20 are substantially rectangular. As shown in FIG. 1a, the distance between upper side 22 and lower side 24 is the shortest dimension of the rectangular openings 20. In a preferred embodiment, the distance between upper side 22 and lower side 24 of an adjacent horizontal strand is less than ⅛ (0.125) inch.

Figure 2:
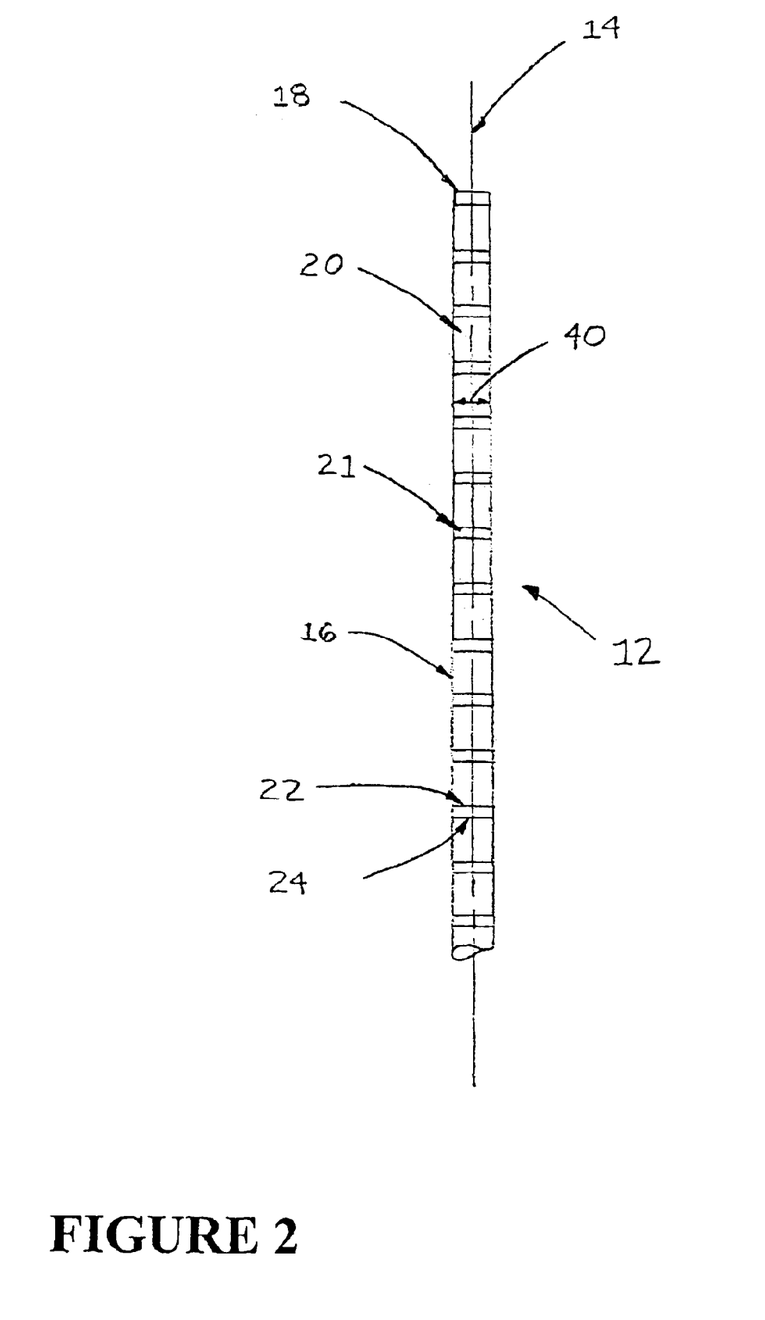

FIG. 2 is a cross-sectional side view of the portion of integrally-formed, mesh panel 12 taken along line 2—2 of FIG. 1a. As best illustrated in FIG. 2, the cross-sectional shape of each horizontal strand 21 is substantially rectangular. It is also contemplated, however, that the cross-sectional shape of each strand and may be circular, square or any other suitable shape. Similarly, the cross-sectional shape of vertical strand 26 or any other strand (angular, arcuate, etc.) may be rectangular, square, circular or any other suitable shape adapted to define a plurality of openings which permit air to flow therethrough while substantially all of the water and roadway debris it encounters is deflected.

As shown in FIG. 2, integrally-formed, mesh panel 12 is adapted to be attached behind a wheel of a vehicle such that it hangs freely from top edge 18 with longitudinal axis 14 being substantially perpendicular to the roadway surface and front face 16 facing the wheel of the vehicle behind which the mud flap is attached. It is also contemplated within the scope of the invention, however, that the mud flap may be attached outside a wheel of a vehicle to prevent water and debris from being sprayed or propelled from the side of the vehicle. In a preferred embodiment of the invention, panel 12 has a thickness, designated by arrowed line 40, of less than ¼ (0.25) inch. In another preferred embodiment of the invention, panel 12 has a thickness of less than ⅛ (0.125) inch.

Figure 3:
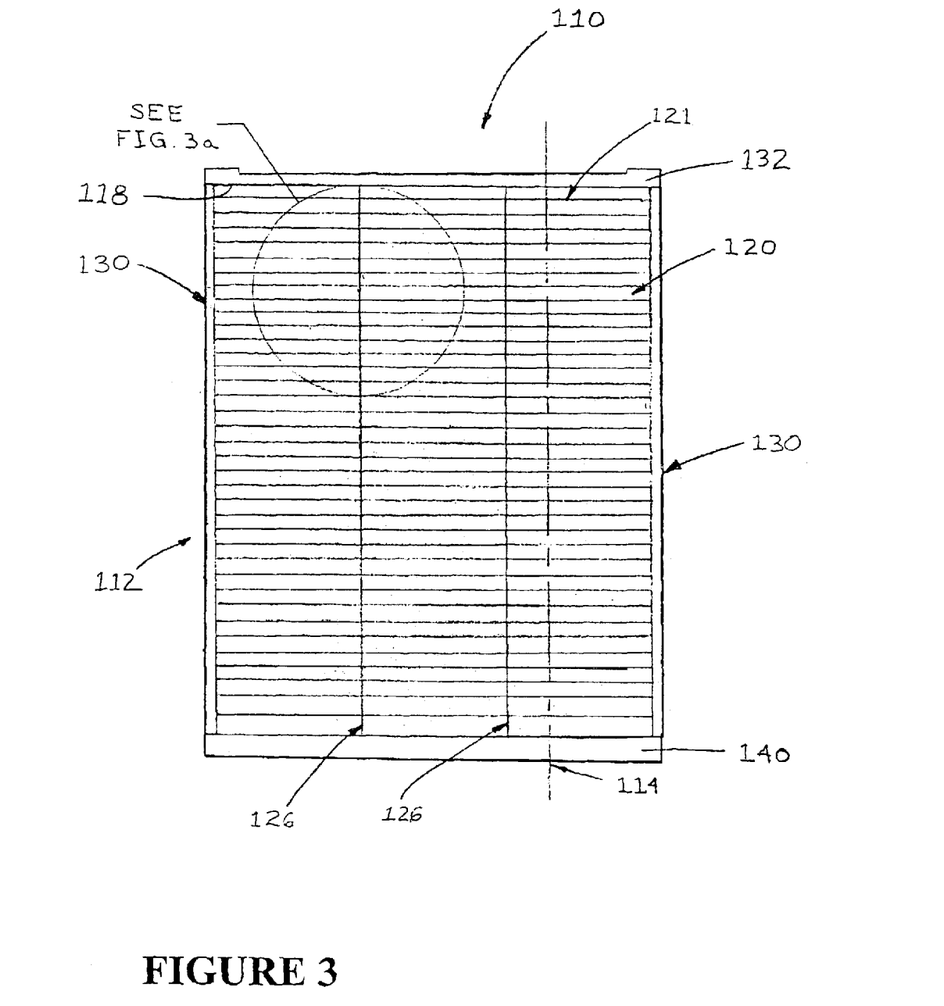
FIG. 3 is a front view of a first alternative embodiment of the invention having vertical and horizontal support members.

FIG. 3 illustrates an alternative embodiment of the mud flap of the invention. As shown in FIG. 3, preferred mud flap 110 includes mesh panel 112. Mesh panel 112 includes a pair of vertical support members 130 and a horizontal support member 140. The vertical and horizontal support members are intended to provide structural support to and improve the deflecting capabilities of the panel. While FIG. 3 illustrates two vertical support members 130 and one horizontal support member 140, it is also contemplated within the scope of the invention that one or more vertical support members 130 and more than one horizontal support member may be provided to improve the strength, stability and deflecting capabilities of the integrally-formed, mesh panel. It is further contemplated that the vertical and horizontal members may be located between the vertical and horizontal strands, respectively. It is preferred that the vertical support members and horizontal support members are spaced at least 5 inches apart, and more preferably, at least 10 inches apart. Openings 120 are defined by a pair of horizontal strands 121 and either a pair of vertical strands 126 or one vertical strand 126 and one vertical support member 130. Connecting strip 132 is provided near top edge 118 and adapted to attach the mud flap behind or outside a wheel of a vehicle such that it hangs in a disposition generally parallel to longitudinal axis 114.

Figure 3A:
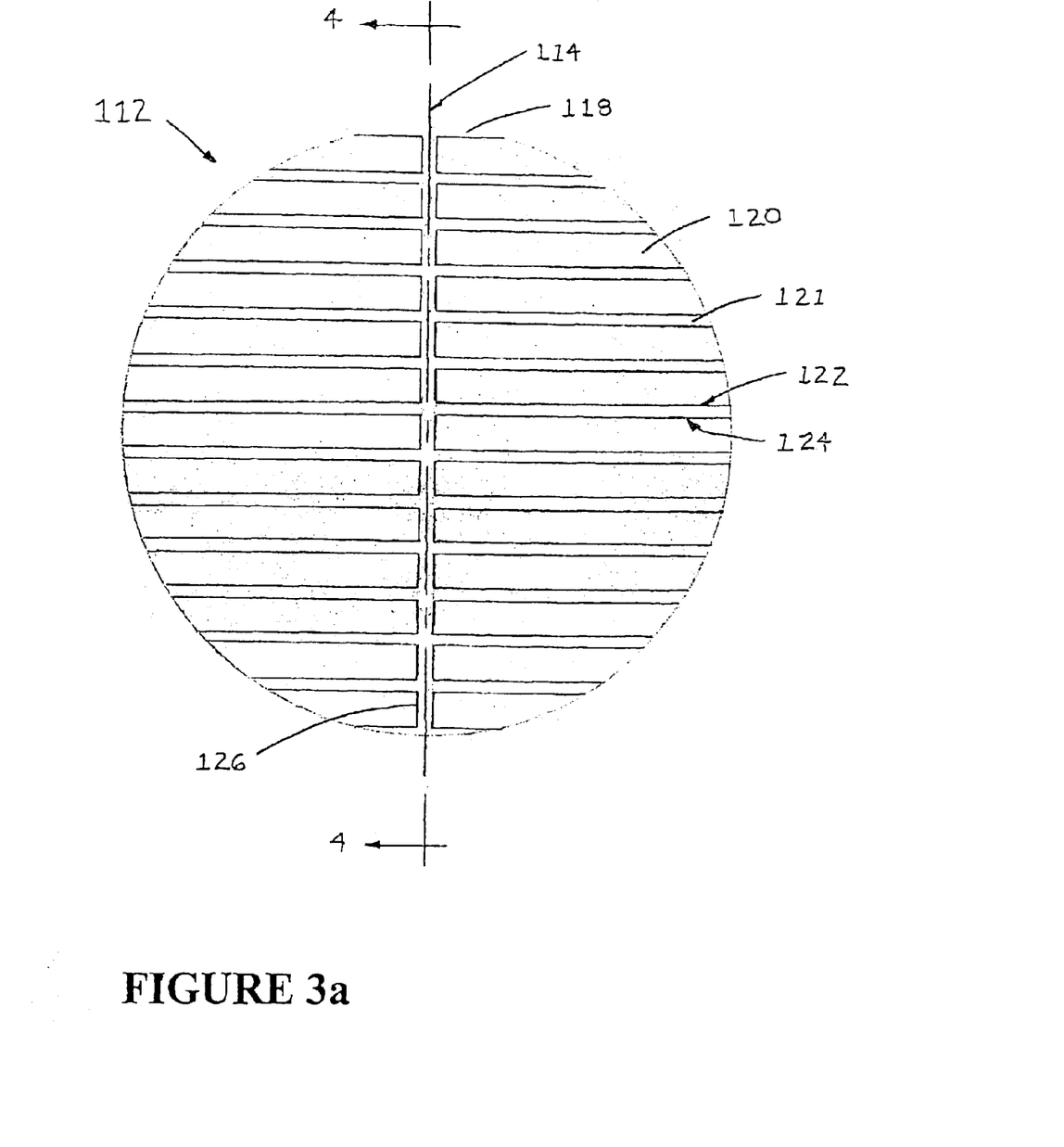
FIG. 3a is an enlarged front view of a portion of the first alternative embodiment of the invention illustrated in FIG. 3.
Figure 3B:
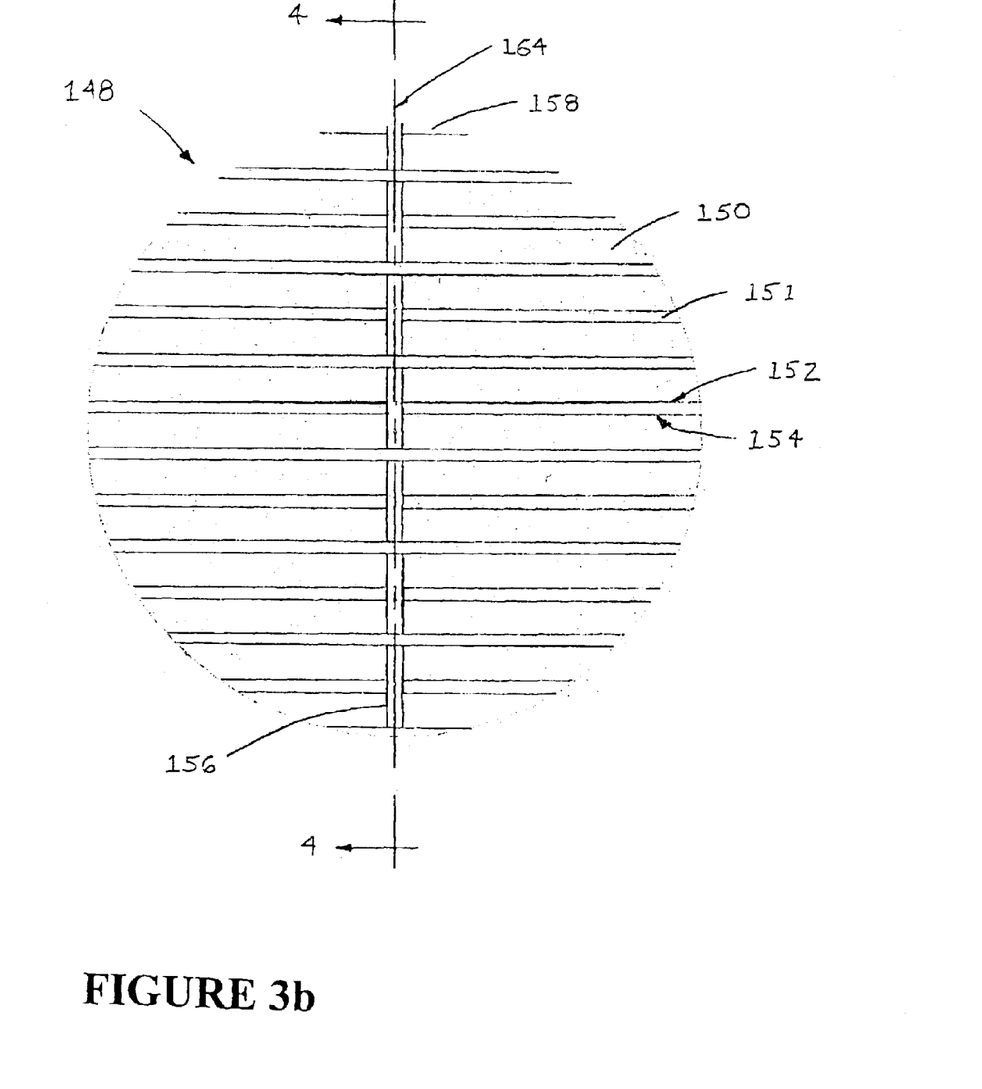
FIG. 3b is a front view of a second alternative embodiment of the invention showing the horizontal and vertical strands interwoven together.

FIG. 3a illustrates an enlarged front view of a portion of the preferred embodiment illustrated in FIG. 3. As shown in FIG. 3a, the portion of preferred panel 112 comprises a plurality of horizontal strands 121 and a vertical strand 126. Each horizontal strand 121 is integrally-formed with vertical strand 126. More particularly, FIG. 3a illustrates a mesh panel comprising a plurality of horizontal strands 121 and vertical strand 126 formed by a press molding process. In addition, each horizontal strand 121 has upper side 122 and lower side 124. Upper side 122 and lower side 124 are substantially perpendicular to vertical axis 114 and vertical strand 126, substantially parallel to top edge 118, and preferably substantially planar. Openings 120 are defined, in part, by upper side 122, lower side 124 and vertical strand 126. Openings 120 are substantially rectangular. FIG. 3a also shows that vertical strand 126 is substantially parallel to longitudinal axis 114, substantially perpendicular to top edge 118, and substantially planar.

Referring now to FIG. 3b, an enlarged front view of a portion of an alternative embodiment of an integrally-formed mesh panel is illustrated. As shown in FIG. 3b, the portion of the preferred panel is designated generally by reference number 148. Each horizontal strand 151 is "integrally-formed" with vertical strand 156. More particularly, FIG. 3b illustrates a mesh panel comprising horizontal strands and a vertical strand interwoven together. As shown in FIG. 3b, each horizontal strand 151 has upper side 152 and lower side 154. Upper side 152 and lower side 154 are substantially perpendicular to vertical axis 164 and vertical strand 156, substantially parallel to top edge 158, and preferably substantially planar. Openings 150 are defined, in part, by upper side 152, lower side 154 and vertical strand 156. Openings 150 are substantially rectangular. FIG. 3b also shows that vertical strand 156 is substantially parallel to longitudinal axis 164, substantially perpendicular to top edge 158, and substantially planar.

Figure 4:
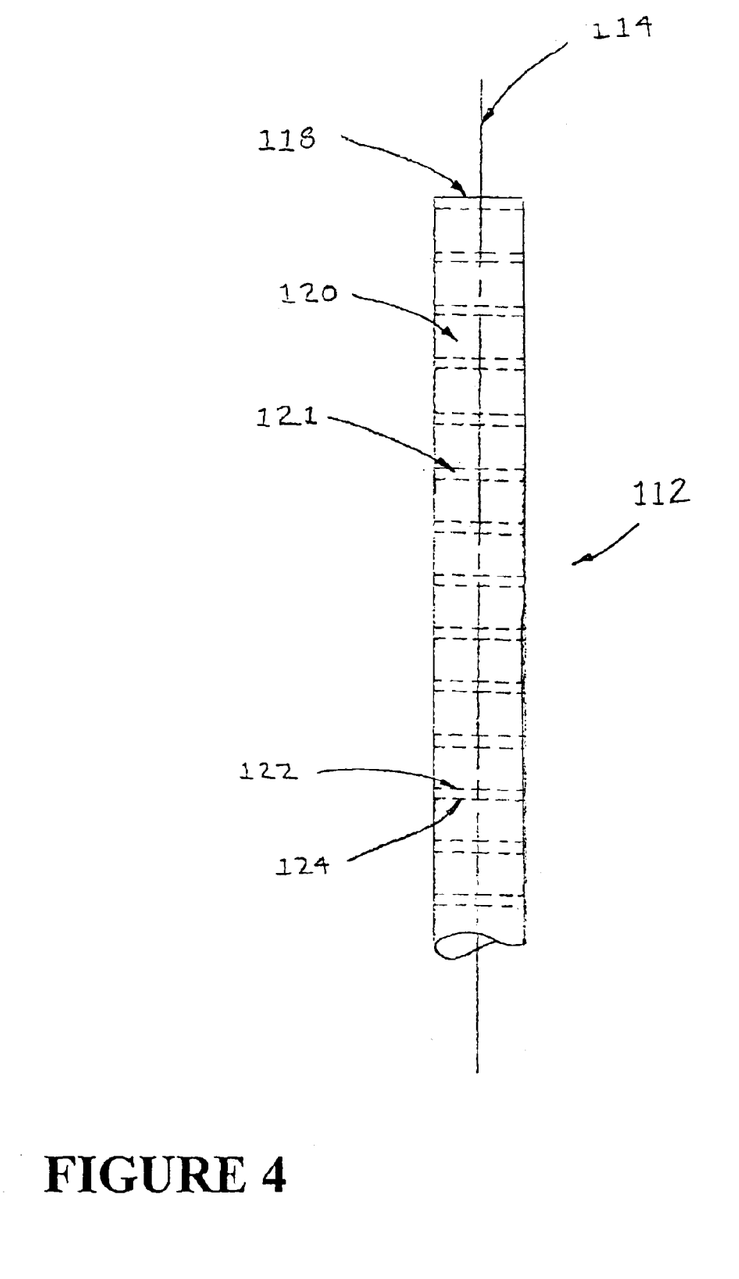
FIG. 4 is a side view of the portion of the first alternative embodiment of the invention illustrated in FIG. 3a taken along line 44.

FIG. 4 illustrates a side view of a portion of integrally-formed, mesh panel 112 taken along line 44 of FIG. 3a. As shown in FIG. 4, integrally-formed, mesh panel 112 is thicker than the panel illustrated in FIG. 2. While the preferred panel has a thickness of less than ¼ (0.25) inch, it is also contemplated that the panel may be thicker than ¼ (0.25) inch. In the embodiment shown in FIG. 4, upper sides 122 and lower sides 124 of horizontal strands 121 are substantially perpendicular to longitudinal axis 114 and substantially parallel to top edge 118. The cross-sectional shape of horizontal strands 121 is substantially rectangular.

Figure 5:
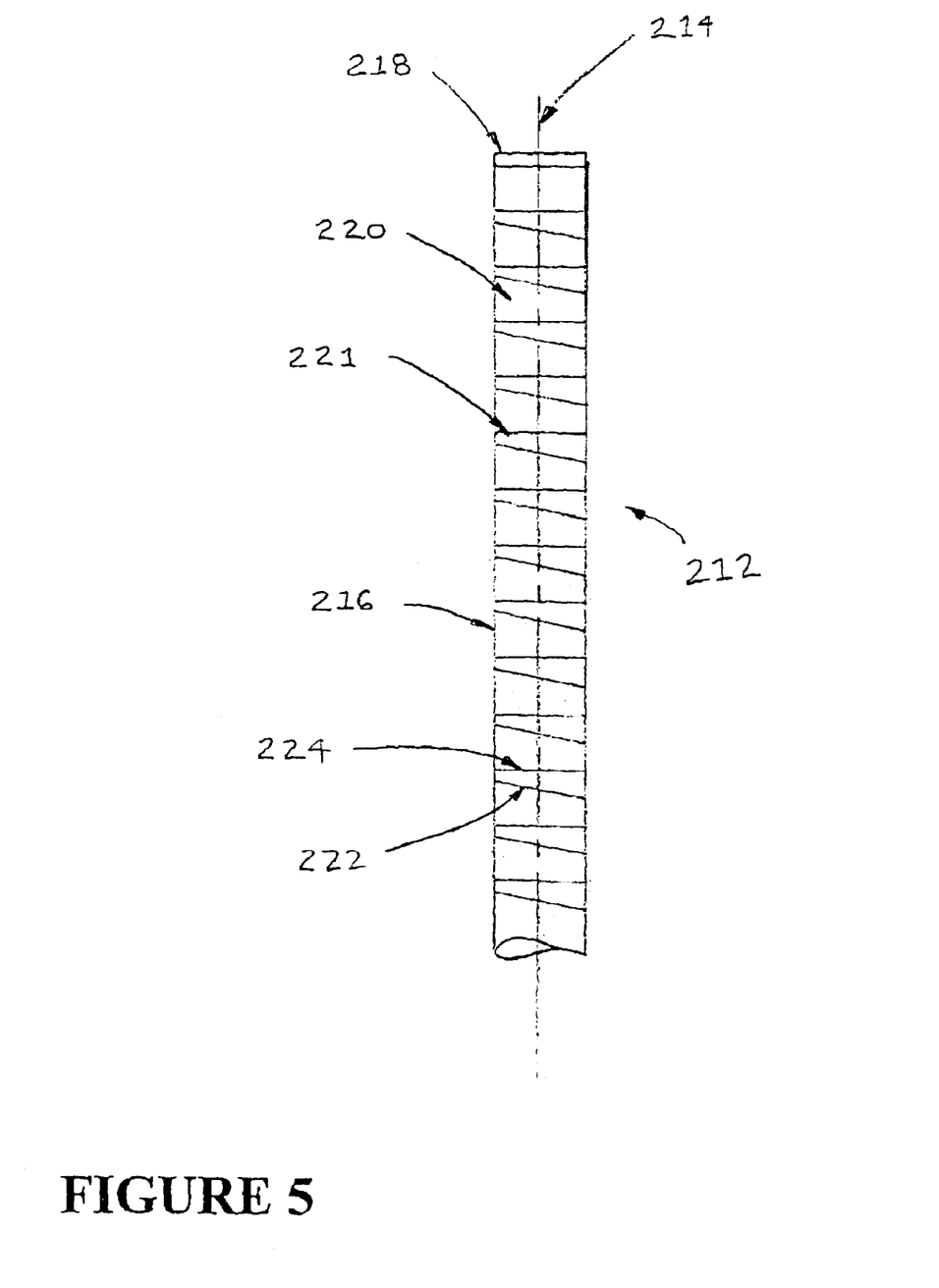
FIG. 5 is a cross-sectional side view of a third alternative embodiment of the invention having rearwardly and downwardly disposed lower sides.

FIG. 5 illustrates a cross-sectional side view of another preferred embodiment of the mud flap designed generally by reference numeral 210. As shown in FIG. 5, the lower side 222 of each horizontal strand 221 is disposed rearwardly and downwardly from front face 216 at an angle of about 80° from longitudinal axis 214. The upper side 224 of each horizontal strand 221 is substantially parallel to top edge 218 and perpendicular to longitudinal axis 214. Each opening 220 is defined by the upper side of a horizontal strand, the lower side of the adjacent horizontal strand, and a pair of opposing vertical strands (not shown). Top edge 218 is substantially perpendicular to longitudinal axis 214. In this embodiment of the invention, the rearwardly and downwardly disposed lower side 222 deflects water and roadway debris passing through opening 220 downwardly towards the roadway surface and away from following traffic.

Figure 6:
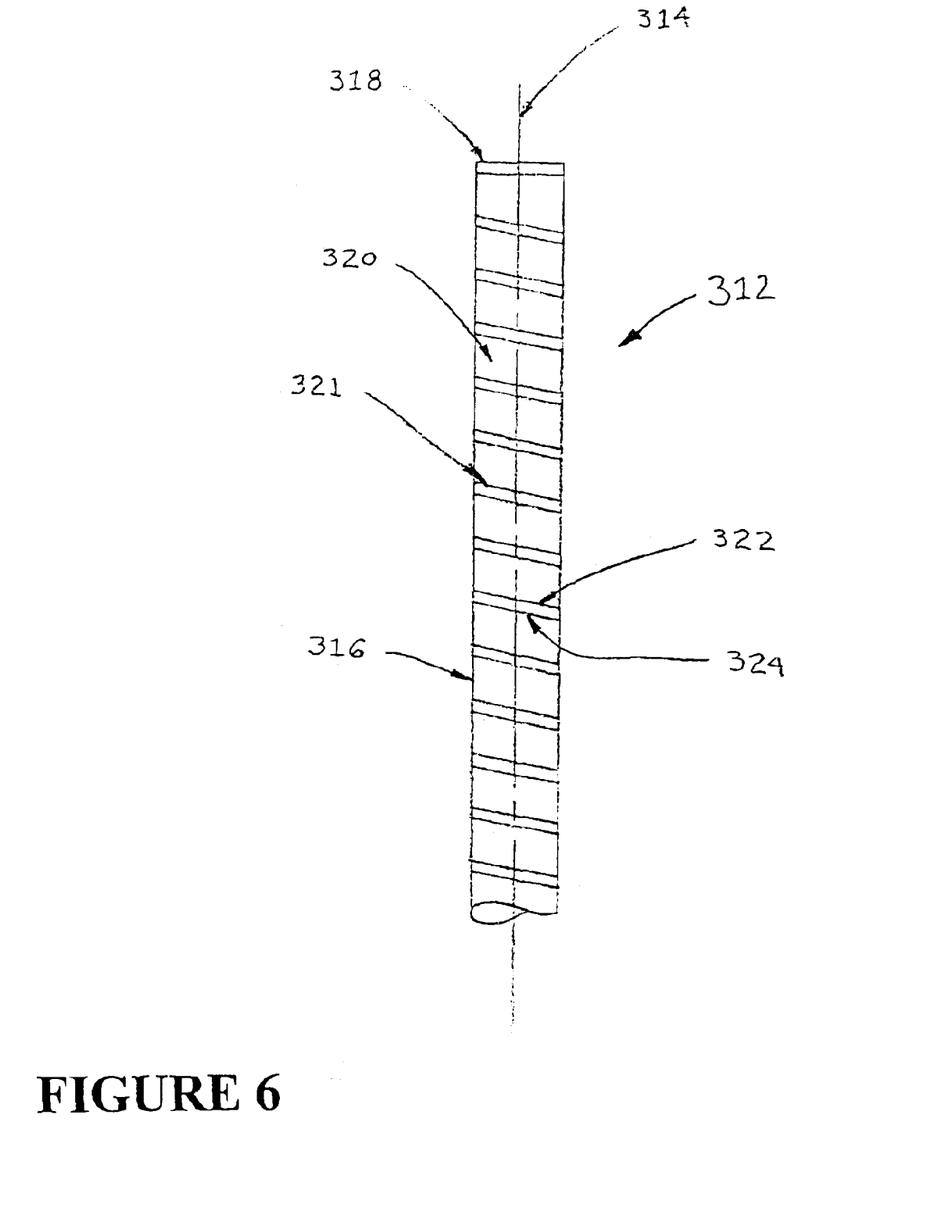
FIG. 6 is a cross-sectional side view of a fourth alternative embodiment of the invention having rearwardly and downwardly disposed upper and lower sides.

FIG. 6 illustrates a cross-sectional side view of another preferred embodiment of the mud flap designated generally by reference numeral 310. As shown in FIG. 6, both upper side 322 and lower side 324 of horizontal strands 321 are disposed rearwardly and downwardly from front face 316 at an angle of about 80° from longitudinal axis 314. Openings 320 are defined by upper side 322 of horizontal strand 321, lower side 324 of the adjacent horizontal strand, and a pair of vertical strands (not shown). Top edge 318 is substantially perpendicular to longitudinal axis 314. In this embodiment of the invention, the rearwardly and downwardly disposed lower sides of horizontal strands 321 deflect water and other debris downwardly towards the roadway and away from following traffic. In addition, the rearwardly and downwardly disposed upper sides of horizontal strand 321 improve air flow through the panel.

Figure 7:
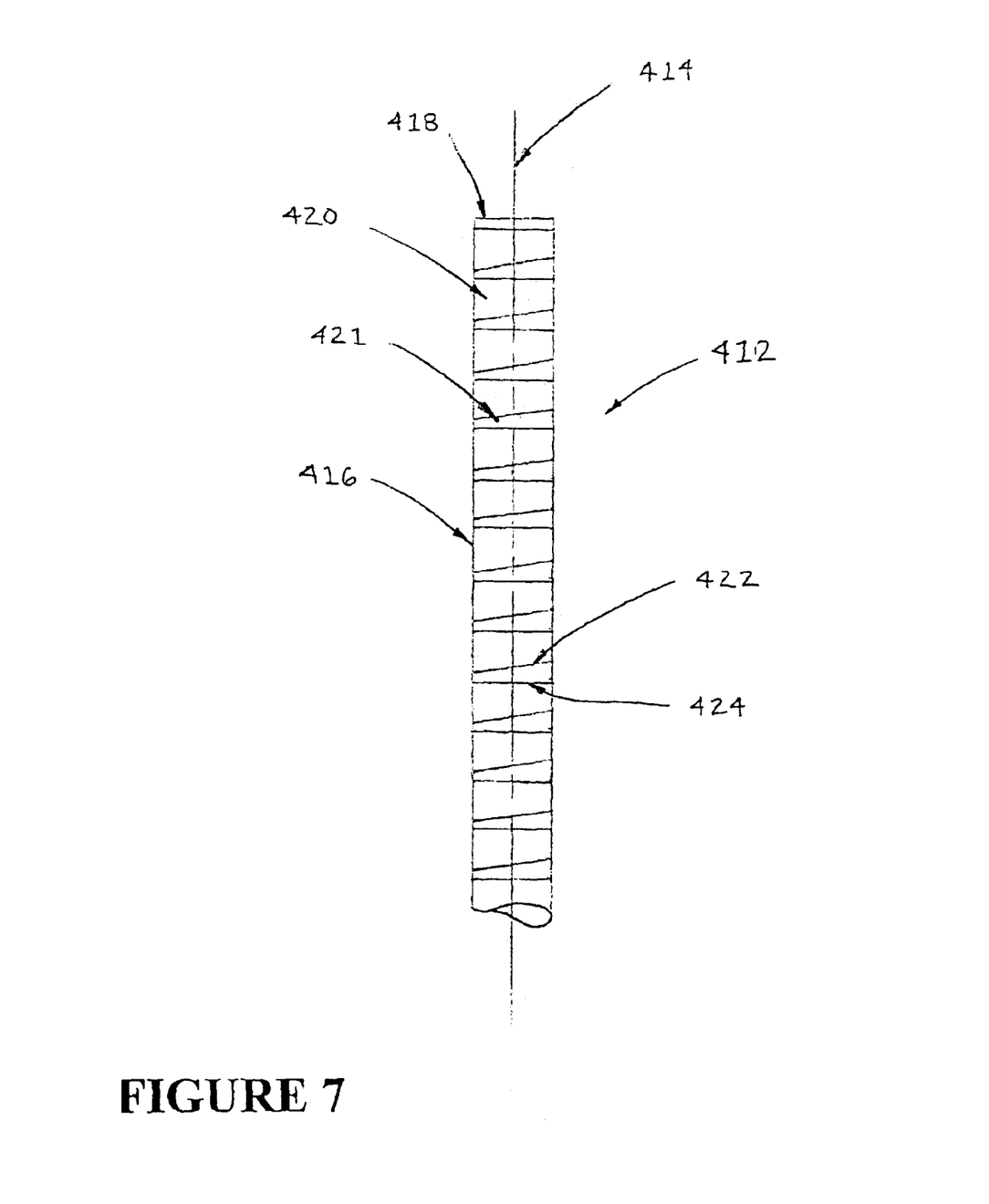
FIG. 7 is a cross-sectional side view of a fifth alternative embodiment of the invention having rearwardly and upwardly disposed upper sides.

FIG. 7 illustrates a cross-sectional view of another preferred embodiment of the mud flap designated generally by reference numeral 410. As shown in FIG. 7, upper side 422 of each horizontal strand 421 is disposed rearwardly and upwardly from front face 416 at an angle of about 80° from longitudinal axis 414. Lower side 424 is substantially parallel to top edge 418 and perpendicular to longitudinal axis 414. Openings 420 are defined by upper side 422 of each horizontal strand 421, lower side 424 of the adjacent horizontal strand, and a pair of vertical strands (not shown). Top edge 418 is substantially perpendicular to longitudinal axis 414. In this embodiment of the invention, air flow through the panel is increased by the rearwardly and upwardly displaced upper sides of the horizontal strands.

Figure 8:
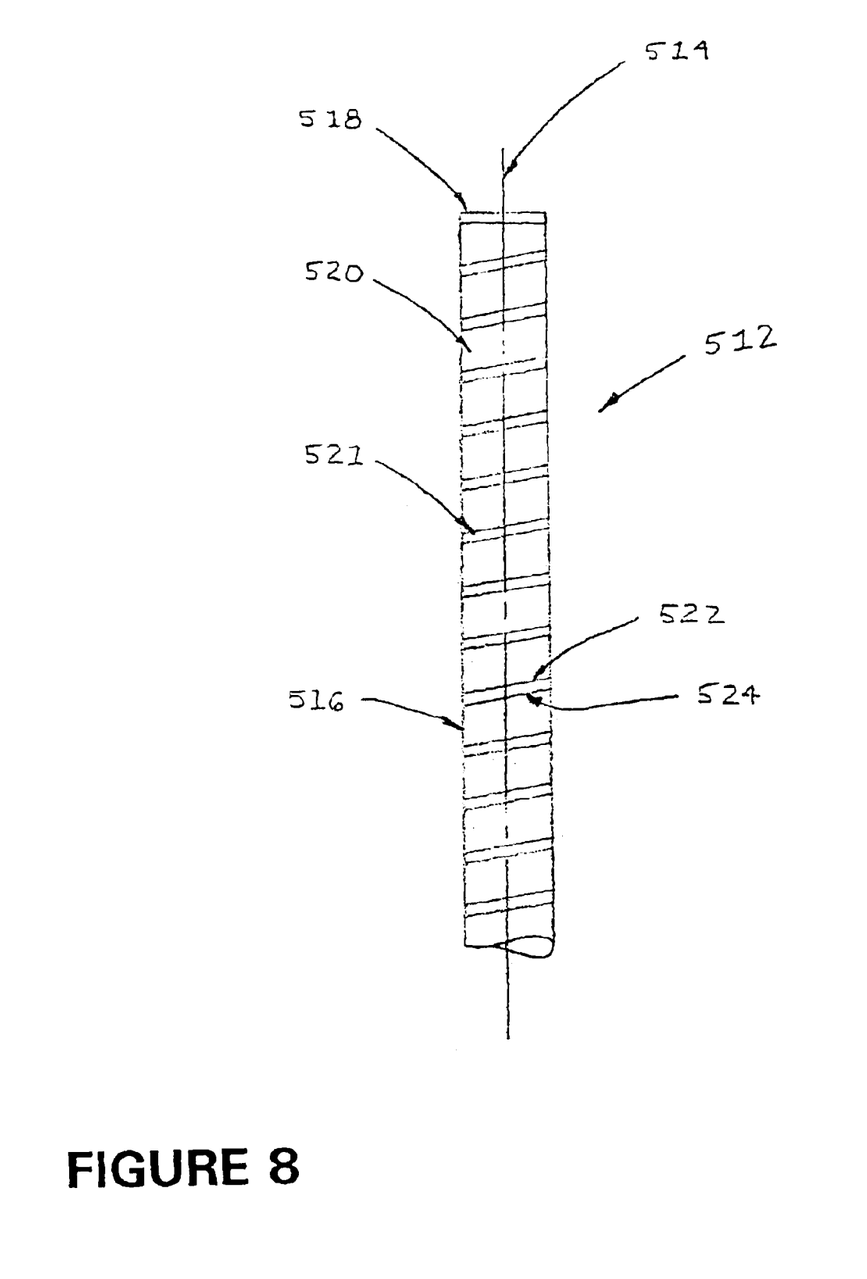
FIG. 8 is a cross-sectional side view of a sixth alternative embodiment of the invention having rearwardly and upwardly disposed upper and lower sides.

FIG. 8 illustrates a cross-sectional view of another preferred embodiment of the mud flap designated generally by reference numeral 510. As shown in FIG. 8, both upper side 522 and lower side 524 of horizontal strands 521 are rearwardly and upwardly disposed from front face 516 at an angle of about 80° from longitudinal axis 514. Openings 520 are defined by upper side 522 of horizontal strand 521, lower side 524 of the adjacent horizontal strand, and a pair of vertical strands (not shown). Top edge 518 is substantially perpendicular to longitudinal axis 514. In this embodiment of the invention, air flow through the panel is increased by the rearwardly and upwardly displaced upper and lower sides of the horizontal strands.

In operation, the various embodiments of the integrally-formed, mesh panel demonstrate the numerous advantages of the invention claimed herein. The relatively large area of the front face of the integrally-formed, mesh panel that is represented by the plurality of openings permits a significant amount of air to flow through the panel with minimal rearward displacement of the panel. As a result, the panel remains disposed in a position substantially perpendicular to the roadway even when a vehicle is traveling at high speeds. When the panel is disposed in such a position, it is capable of deflecting a greater amount of water and roadway debris away from following traffic. In addition, the increased amount of air flow through the panel reduces the drag forces created by the mud flap, thereby increasing fuel efficiency. The large area of the openings in the panel and the resulting air flow also prevents the mud flap from significantly increasing the temperature in the vicinity of the tire. Further, the relatively large area of the openings in the panel reduces the overall weight of the panel, thereby increasing fuel efficiency and payload capacity.

By contrast, the relatively small size of each opening in the panel means that substantially all of the water and roadway debris encountered by the panel will be deflected by the panel. More particularly, the relatively small size of each opening in the panel means that substantially all water and other roadway debris encountered by the panel will be impeded, obstructed or impaired by the strands of the panel. In other words, substantially all water and roadway debris encountered by the panel will not pass through the panel without contacting the strands of the panel. Consequently, the panel will reduce, if not eliminate, the amount of water and debris propelled into the line of vision of following traffic by "catching," "knocking down" or deflecting the water and other roadway debris. When the minimum dimension of each opening is sized such that air may easily flow through the panel while substantially all water and roadway debris encountered by the panel is deflected, the apparatus of the invention is most effective.

The various embodiments of the openings in the integrally-formed, mesh panel demonstrate additional advantages of the invention. In certain preferred embodiments of the invention, the horizontal strands of the panel are angled rearwardly and downwardly from the tire to increase the amount of water and roadway debris deflected downwardly by the panel. As a result, less water and roadway debris will be propelled into following traffic. In other preferred embodiments, the horizontal strands of the panel are angle rearwardly and upwardly from the tire to increase the amount of water and roadway debris that may flow through the panel and minimize the amount of water and roadway debris that is projected off the sides or the bottom of the panel.

Finally, the simplicity of the design and method of manufacture of the mud flap demonstrates the advantages of the mud flap claimed herein over existing mud flaps. The minimal thickness of the panel makes it suitable for use on almost all motor vehicles and reduces the problem of clogging in the openings of the panel. Further, the single-panel design of the mud flap makes unclogging or cleaning the mud flap simple and easy. The mud flap of the invention may be manufactured inexpensively using current molding technology, and it is inexpensive to replace, repair and maintain.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations, and the same are intended to be comprehended within the meaning and range of equivalents of the appended claims.

What is claimed is:

1. A mud flap that is adapted to be attached to a vehicle behind or outside a wheel thereof; said mud flap comprising:
   (a) an integrally-formed, mesh panel, said panel comprising:
      (i) a front face;
      (ii) a top edge;
      (iii) a plurality of strands;
      (iv) a plurality of openings defined by said plurality of stands, each of said plurality of openings having a minimum dimension of no more than ⅛ (0.125) inch;
      wherein the sum of the areas of the plurality of openings represents at least 75% of the surface area of the front face of the panel; wherein the openings in the integrally-formed, mesh panel are adapted to permit air to flow therethrough; and
      wherein the openings in the integrally-formed, mesh panel are sized such that substantially all water and roadway debris encountered by the panel is deflected by the panel;
   (b) a means for attaching the panel to the vehicle.

2. The mud flap of claim 1 wherein the integrally-formed, mesh panel is made from a polymeric material.

3. The mud flap of claim 1 wherein the integrally-formed, mesh panel has a thickness of less than ¼ (0.25) inch.

4. The mud flap of claim 1 wherein the integrally-formed, mesh panel has a thickness of less than ⅛ (0.125) inch.

5. The mud flap of claim 1 wherein the plurality of strands comprise a plurality of substantially parallel, horizontally-disposed strands.

6. The mud flap of claim 1 wherein the plurality of strands comprise a plurality of substantially parallel, vertically-disposed strands.

7. The mud flap of claim 1 wherein the plurality of strands are interwoven.

8. The mud flap of claim 1 wherein the sum of the areas of the openings of the integrally-formed, mesh panel represents at least 85% of the surface area of the front face of the panel.

9. The mud flap of claim 1 wherein the plurality of openings are sized such that there are between 8 and 16 openings per linear inch of the panel.

10. The mud flap of claim 1 wherein the plurality of openings are sized such that there are between 64 and 256 openings per square inch of the panel.

11. The mud flap of claim 1 wherein the mud flap includes a plurality of vertical support members adapted to provide support to the panel.

12. The mud flap of claim 11 wherein the plurality of vertical support members are spaced apart at least 5 inches from each other.

13. The mud flap of claim 11 wherein the plurality of vertical support members are spaced apart at least 10 inches from each other.

14. The mud flap of claim 1 wherein the mud flap includes a plurality of horizontal support members adapted to provide support to the panel.

15. The mud flap of claim 14 wherein the horizontal support members are spaced apart at least 5 inches from each other.

16. The mud flap of claim 14 wherein the horizontal support members are spaced apart at least 10 inches from each other.

17. The mud flap of claim 1 wherein the means for attaching the mud flap to a vehicle is located near the top edge of the integrally-formed, mesh panel.

18. A method for deflecting water and roadway debris, said method comprising the following steps:
   (A) providing a mud flap, said mud flap comprising:
      (1) an integrally-formed, mesh panel, said panel comprising:
         (i) a front face;
         (ii) a top edge;
         (iii) a plurality of strands;
         (iv) a plurality of openings defined by said plurality of strands, each of said plurality of openings having a minimum dimension of no more than ⅛ (0.125) inch;
      wherein the sum of the areas of the plurality of openings represents at least 75% of the surface area of the front face of the panel; wherein the openings in the integrally-formed, mesh panel are adapted to permit air to flow therethrough; and
      wherein the openings in the integrally-formed, mesh panel are sized such that substantially all water and roadway debris encountered by the panel is deflected by the panel;
   (B) attaching the mud flap behind a wheel of the vehicle.

19. The method of claim 18 wherein the mud flap is attached to the vehicle such that the mud flap is located outside of a wheel of the vehicle.

* * * * *